United States Patent [19]
Alexander, III et al.

[11] Patent Number: 6,118,940
[45] Date of Patent: Sep. 12, 2000

[54] METHOD AND APPARATUS FOR BENCHMARKING BYTE CODE SEQUENCES

[75] Inventors: William Preston Alexander, III; Robert Francis Berry; Riaz Hussain; Paul Jerome Kilpatrick; Robert John Urquhart, all of Austin, Tex.

[73] Assignee: International Business Machines Corp., Armonk, N.Y.

[21] Appl. No.: 08/978,513

[22] Filed: Nov. 25, 1997

[51] Int. Cl.$^7$ ...................................................... G06F 9/45
[52] U.S. Cl. ................................. 395/704; 709/1; 714/38
[58] Field of Search ............................. 395/500.43, 704, 395/708, 709; 712/300; 709/1; 714/38

[56] References Cited

U.S. PATENT DOCUMENTS

| | | | |
|---|---|---|---|
| 5,347,647 | 9/1994 | Allt et al. | 714/28 |
| 5,355,460 | 10/1994 | Eickemeyer et al. | 712/215 |
| 5,459,844 | 10/1995 | Eickemeyer et al. | 712/213 |
| 5,465,258 | 11/1995 | Adams | 395/704 |
| 5,502,826 | 3/1996 | Vassiliadis et al. | 712/213 |
| 5,615,357 | 3/1997 | Ball | 395/500.42 |
| 5,668,999 | 9/1997 | Gosling | 395/704 |
| 5,687,343 | 11/1997 | Fecteau et al. | 711/202 |
| 5,699,507 | 12/1997 | Goodnow, II et al. | 714/38 |
| 5,740,441 | 4/1998 | Yellin et al. | 395/704 |
| 5,748,964 | 5/1998 | Gosling | 395/705 |
| 5,768,593 | 6/1998 | Walters et al. | 395/705 |
| 5,784,553 | 7/1998 | Kolawa et al. | 714/38 |
| 5,819,066 | 10/1998 | Bromberg et al. | 707/102 |
| 5,860,008 | 1/1999 | Bradley | 395/704 |
| 5,905,895 | 5/1999 | Halter | 395/704 |
| 5,909,577 | 6/1999 | Devanbu | 395/704 |
| 5,913,023 | 6/1999 | Szermer | 714/38 |
| 5,956,510 | 9/1999 | Nicholas | 395/701 |

FOREIGN PATENT DOCUMENTS

WO 96/12229 4/1996 WIPO ............................. G06F 12/06

OTHER PUBLICATIONS

Coffe, P.; "Java Security Questions Arise"; PC Week; Sep. 22, 1997, p. 001. PROMT [online]. Retrieved from STN International, Accession No. 97:502664, Sep. 1997.

Hsieh, C.-H.; Conte, M.; Gyllenhaal, J.; Hwu, W.-M.; "Optimizing NET Compilers for Improved Java Performance"; Computer; vol. 30, No. 6, pp. 67–75, Jun. 1997.

Cierniak, M.; Li, W.; "Briki: an Optimizing Compiler"; Proceedings IEEE Compcon '97; pp. 179–184, Feb. 1997.

Lambright, H. D.; "Java Bytecode Optimizations"; Proceedings IEEE Compcon 1997; pp. 206–210.

Hsieh, C.-H.; Gyllenhaal, J.; Hwu, W.-M.; "Java Bytecode to Native Code Translation: The Caffeine Prototype and Preliminary Results"; Proceedings of the 29th Annual IEEE/ACM International Symposium on Microarchitecture; pp. 90–97, Dec. 1996.

Meyer, J.; Downing, T.; "Java Virtual Machine"; O' Reilly & Associates; pp. 1–452, Jan. 1997.

Hsieh, C.-H.; Conte, M.; Johnson, T.; Gyllenhaal, J. Hwu, W.-M.; "A Study of the Cache and Branch Performance Issues with Running Java on Current Hardware Platforms"; Proceedings of IEEE Compcon '97; pp. 211–216, Feb. 1997.

*Primary Examiner*—Tariq R. Hafiz
*Assistant Examiner*—Brian Sattizahn
*Attorney, Agent, or Firm*—Barry S. Newberger; Winstead Sechrest & Minick P.C.; Jeffrey S. LaBaw

[57] ABSTRACT

Method and apparatus for creating benchmark programs for the analysis of java virtual machine implementations are implemented. Java applications and applets are compiled into an intermediate code referred to as byte code. The Java byte code forms the machine code for the Java Virtual Machine. The Java Virtual Machine running on top of a hardware platform translates the byte code into native machine code for execution on the hardware platform on which the Java Virtual Machine is running. The performance of a Java Virtual Machine is improved by the use of a so-called "just in time" (JIT) compiler that translates commonly occurring sequences of bytes codes in the native instruction sequences which are then stored for later execution. Critical to the performance of the JIT is the ability of the JIT to optimally compile for the most commonly occurring sequences of byte codes. The method and apparatus for creating benchmark programs provides a means for performance measurements with respect to such sequences.

43 Claims, 6 Drawing Sheets

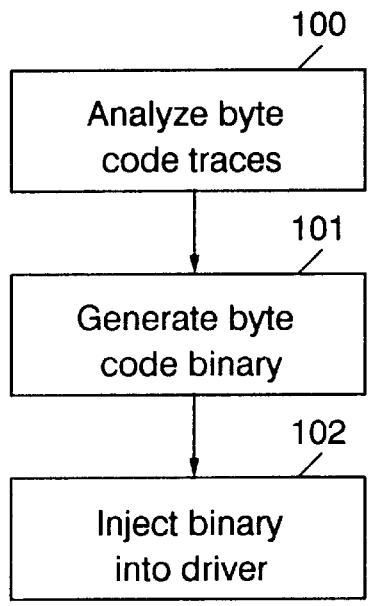
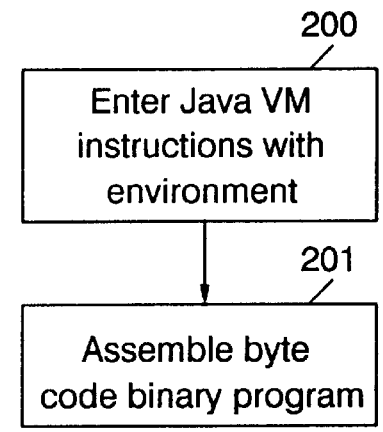
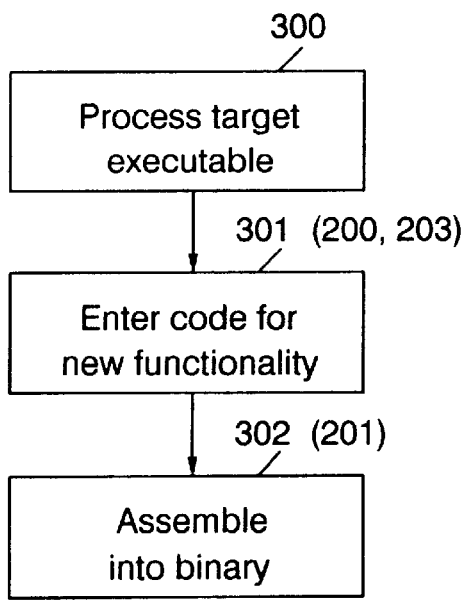
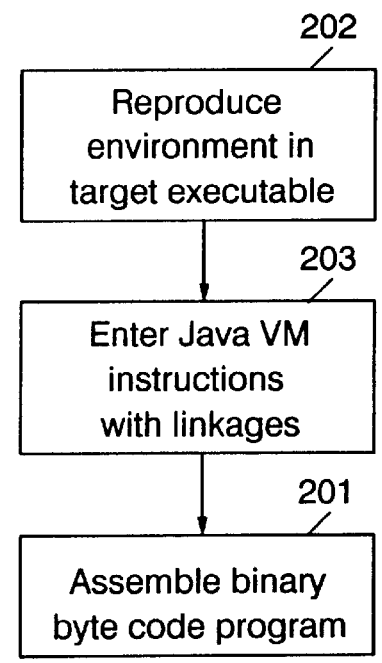

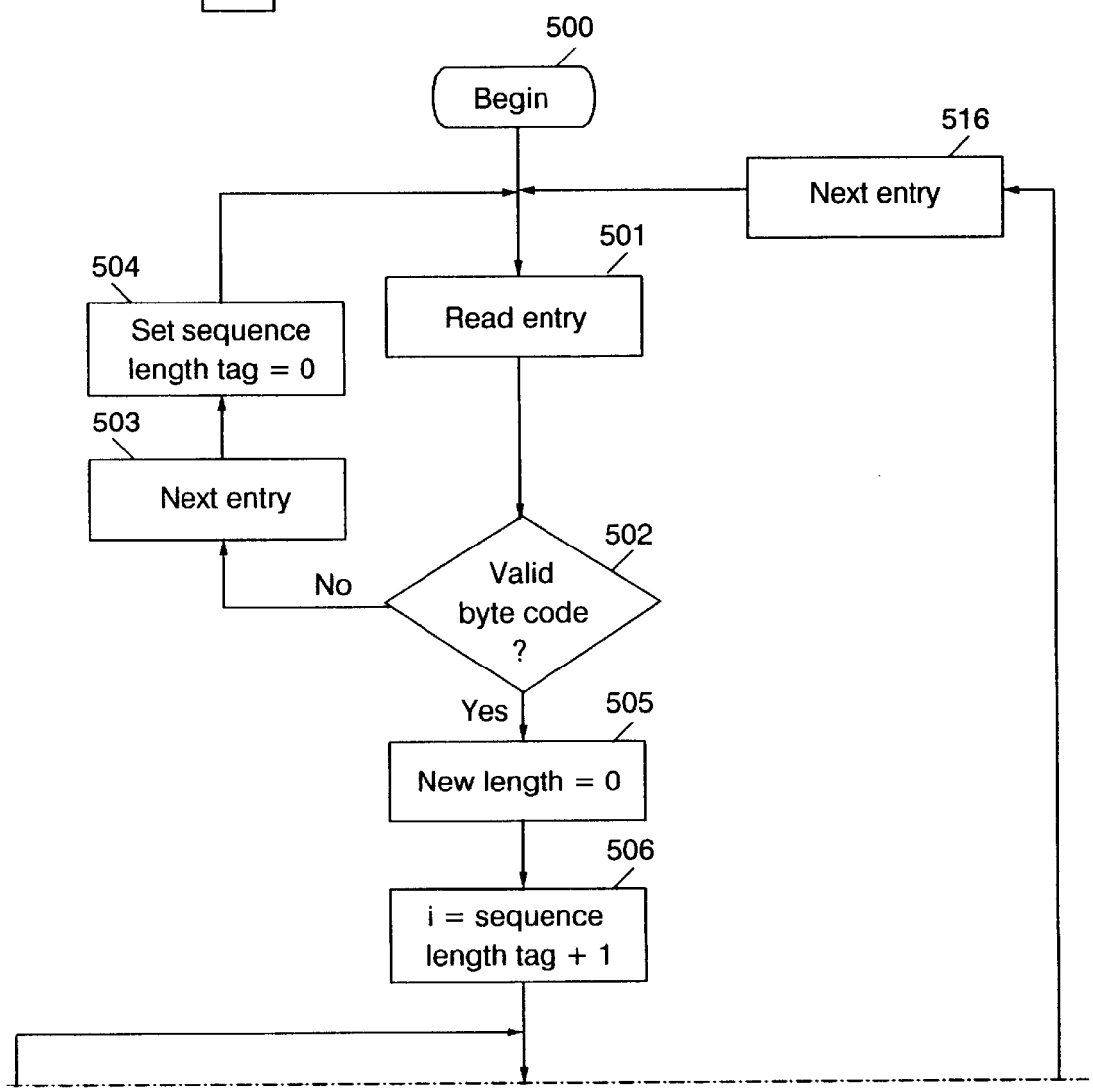

FIG. 6 ababcfg
———
600

| 601a | 601b |
|------|------|
| "1"  | "b"  |
| "2"  | "ab" |
| "3"  | "bab"|
| "4"  | "abab"|

601

| 602a | 602b |
|------|------|
| "a"  | 2    |
| "b"  | 2    |
| "ab" | 2    |
| "ba" | 1    |
| "aba"| 1    |
| "bab"| 1    |
| "abab"| 1   |

602

| 603a | 603b |
|------|------|
| "1"  | "c"  |
| "2"  | "bc" |
| "3"  | "abc"|
| "4"  | "abac"|

603

| 604a | 604b |
|------|------|
| "a"  | 2    |
| "b"  | 2    |
| "ab" | 2    |
| "ba" | 1    |
| "aba" | 1   |
| "bab" | 1   |
| "abab" | 1  |
| "c"  | 1    |
| "bc" | 1    |
| "abc" | 1   |
| "abac" | 1  |

604

METHOD AND APPARATUS FOR BENCHMARKING BYTE CODE SEQUENCES

CROSS REFERENCE TO RELATED APPLICATIONS

This application for patent is related to the following co-pending application for patent assigned to a common assignee:

SYSTEM AND METHOD FOR DYNAMIC MODIFICATION OF CLASS FILES, Ser. No. 08/963,080 (AT9-97-275).

This cross-referenced application is hereby incorporated by reference into this application as though fully set forth herein.

COPYRIGHT NOTIFICATION

A portion of the disclosure of this document contains material which is subject to copyright protection. A copyright owner has no objection to the facsimile reproduction by anyone of the patent document or the patent disclosure, as it appears in the Patent and Trademark Office patent file or records, but otherwise reserves all copyright works whatsoever.

TECHNICAL FIELD

The present invention relates to data processing systems in general, and in particular, to interpreted languages for programming data processing systems.

BACKGROUND INFORMATION

Rapid growth of the "Internet," a worldwide communications network of computers, has stimulated the interest in distributed data processing. In a distributed data processing environment, a server can download an application to a client, and the client then executes the application. An even greater degree of sophistication in distributed processing is manifested in distributed data processing systems that allow a local data processing device to invoke methods on a remote host just as if they were implemented locally. In order for distributed data processing to function in an open network environment such as the Internet, it is necessary that the distributed applications be platform neutral. In other words, there is no way in such a networking environment for the server to know the computing platform with which it is communicating. Applications transmitted for remote execution must be able to function independent of the computing platform to which they are targeted.

Java is a programming language designed to be platform neutral. For this reason, it has rapidly become a popular programming language for distributed data processing.

Java source code is compiled to run on a Java Virtual Machine ("Java VM"). Any platform from which a Java VM has been implemented can execute Java applications. The Java VM interfaces the platform independent compiled Java source code to the platform on which the application is being executed. The Java VM is a software engine running on top of the hardware and operating system of the target platform.

Platform independency is achieved by the compilation of Java source code into a set of one byte digits called "byte code." A byte code may be viewed as a machine code for the Java VM, wherein each byte code corresponds to a Java VM instruction. The Java VM instructions are defined in the specifications for the Java VM. The byte code is platform independent. The Java VM then acts as an interpreter between the Java byte code and the specific system on which the Java program is executing.

Although platform independence is an advantage of Java, it is acquired at a price. Because Java is an interpreted programming language, Java applications execute more slowly than a similar program produced using a compiled language, such as C or C++, would execute. The Java Virtual Machine steps through the compiled Java program, typically referred to as a Java class file, byte code-by-byte code translating each into native instruction sequences on the fly. This process is slower in executing applications than are languages compiled and then loaded as a set of native machine instructions. In order to improve performance of Java applications, it is becoming more common now for Java interpreters to include "Just In Time" ("JIT") compilers. JIT compilers translate certain Java byte code segments into machine code for the particular hardware platform on which the Java VM is implemented. This translation occurs at one time and the block of compiled code is then stored for later execution.

Different Java VM implementations handle byte code interpretation in a variety of ways. Therefore, there can be a significant variation in performance among different Java VM implementations. The ability of the JIT within a particular Java VM implementation to optimally compile for the most commonly occurring sequences of byte codes is critical to the performance of that Java VM implementation. In order to improve the performance of the JIT, and its Java VM implementation, there is a need in the art for a method and apparatus of detecting, articulating and accurately measuring such commonly occurring byte code sequences.

SUMMARY OF THE INVENTION

The aforementioned need is addressed by the present invention which identifies frequently occurring byte code sequences and obtains performance measures thereof. The invention first identifies frequently appearing byte code sequences within a byte code trace. The frequently occurring sequences are then abstracted for stand alone execution, in which they are formulated into a byte code assembly program. This assembly program is then assembled and injected into a Java benchmark driver program.

Byte code trace analysis identifies sequences of byte codes that appear with some frequency in the byte code image of an application of interest. The byte code trace is simply the record of a specific sequence of byte codes encountered by the Java VM in executing an application of interest. A byte code trace of any particular application may include several million byte codes. Byte code sequences of interest, such as those that are frequently occurring, may have variable length from a single byte code to a preselected maximum length of about 30 byte codes. Byte code analysis identifies those sequences that occur with a frequency exceeding a preselected value, reports those sequences, and the frequency of occurrence.

Selected frequently occurring byte code sequences are then formulated into a byte code assembly program. A particular byte code sequence may have an associated environmental dependency which must be reproduced for the extracted byte code sequence. The Java VM instructions establishing the linkages to these environmental dependencies along with the Java VM instructions corresponding to the byte code sequence to be benchmarked from the binary byte code assembly program are formed.

The binary byte code program is injected into a benchmark executable. The benchmark executable is a Java skeleton that includes methods implementing measurement tools to obtain accurate timings and other hardware metrics for the byte code sequence being benchmarked. Execution of the target executable with the injected byte code binary program then generates the required benchmarking statistics.

These, and other features and advantages, will be more clearly understood from the following detailed description taken in conjunction with the accompanying drawings. It is important to note the drawings are not intended to represent the only form of the invention.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts a flow diagram in accordance with a method of an embodiment of the present invention.

FIG. 2A illustrates a flow diagram of a byte code assembly method in accordance with an embodiment of the present invention.

FIG. 2B illustrates a flow diagram of a byte code assembly method in accordance with an embodiment of the present invention.

FIG. 3 illustrates a flow diagram of a byte code assembly method in accordance with an alternative embodiment of the present invention.

FIG. 5A depicts a first portion of a flow diagram of a byte code sequence analysis method in accordance with an embodiment of the present invention.

FIG. 6 schematically illustrates associative array data structures in accordance with an embodiment of the present invention.

DETAILED DESCRIPTION

Figure 4:
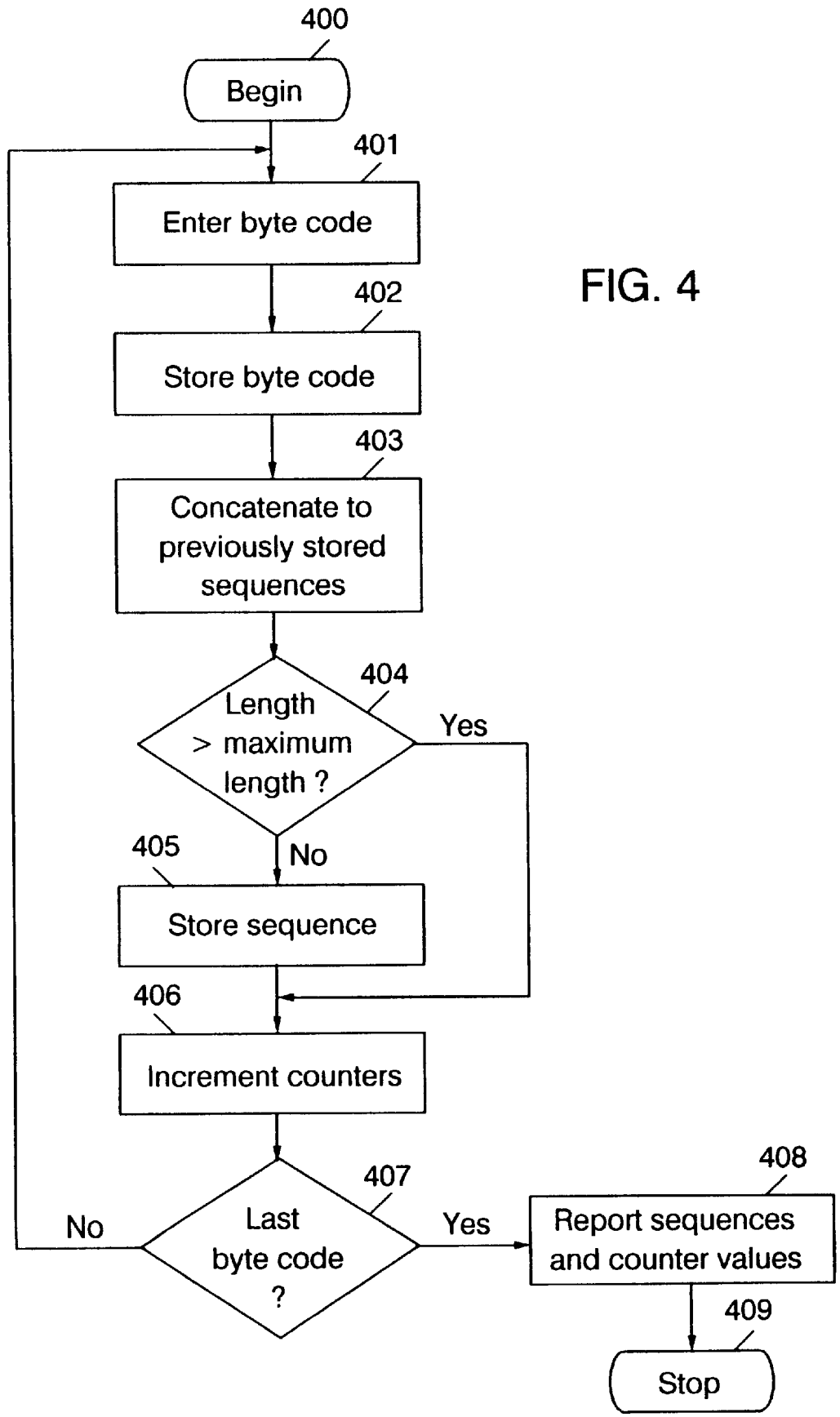
FIG. 4 illustrates a flow diagram of a byte code sequence analysis method in accordance with an embodiment of the present invention.

In the following description, numerous descriptive details are set forth to provide a thorough understanding of the present invention. However, it will be obvious to those skilled in the art that the present invention may be practiced without such specific details.

Refer now to the drawings wherein depicted elements are not necessarily shown to scale and wherein like or similar elements are designated by the same reference numeral through the several views.

Refer now to FIG. 1 in which is depicted a flow chart of an embodiment of the present invention. In step 100, the data processing system analyzes a byte code trace to identify frequently occurring byte code sequences. That is, a byte code trace is a list of virtual machine instructions that the Java VM executes in performing an application of interest. An individual byte code is a numerical value that corresponds to an eight bit, or one byte, binary number. Each byte code represents a Java VM instruction. Byte codes are often represented in human readable form in ASCII characters corresponding to their value in hexadecimal, or base-16, notation. By way of illustration, the byte code value seventy-nine is the Java VM instruction for storing a value into an array containing integer values. In ASCII characters, this byte code instruction has the hexadecimal representation "0x4F" in accordance with conventional practice in the art. In an embodiment of the present invention, byte code analysis may proceed in a byte code trace in the form of binary values themselves. In an alternative embodiment, a byte code trace in the form of binary values may first be converted to the ASCII representation of the binary values, as just described, on a byte code analysis performed on the byte code trace as represented in ASCII format. An embodiment of the present invention in which the byte code trace analysis process is performed on a byte code trace in ASCII format will be described subsequently. Byte code trace analysis identifies sequences of byte codes that appear frequently in the application of interest. Frequently occurring byte code sequences are those sequences that occur at least a preselected number of times in the byte code trace of the application of interest.

Frequently occurring sequences in the application of interest may then be targeted for benchmarking by incorporating them into a Java benchmarking shell. In order to do this, a byte code binary must be generated corresponding to a byte code sequence to be benchmarked, step 101. In generating the byte code binary, any environmental dependencies associated with the byte code sequence to be benchmarked must also be reproduced or synthesized. That is, the extracted byte code sequence to be benchmarked must be placed in its appropriate context. For example, if the byte code sequence of interest updates an element of an array, then the array must first be created before that byte code sequence is executed.

Refer now to FIGS. 2A and 2B in which alternative embodiments of the present invention for generating byte code binaries are depicted. In an embodiment of the present invention, step 102a corresponds to step 102. In step 102a, Java VM instructions are entered including instructions for synthesizing the environment required by the byte code sequence to be benchmarked (step 200). In step 201, these Java VM instructions are assembled into a byte code binary program. It is understood in the art that Java assembly is the process of replacing Java VM instructions in human readable form with the corresponding byte codes and any operand values representing the operands on which the machine instructions operate. Although the process of assembly may, in principal, be carried out by hand, it is envisioned, in an embodiment of the present invention, that the process of assembly is performed by the data processor.

In an alternative embodiment, step 102b corresponds to step 102 of FIG. 1. In step 102b, an environmental context may be reproduced in a target executable. In such an alternate embodiment of the present invention, the environmental context is reproduced by introducing it into the target executed source code in step 202. That is, the source code for the Java benchmarking shell is modified to incorporate source code implementing the environmental dependencies required by the byte code sequence to be benchmarked. Compilation of the resulting Java source code then yields a benchmark shell binary that includes the required environmental dependencies. Nevertheless, it is still necessary, when building a byte code binary representing the sequence to be benchmarked, to incorporate within the Java VM instructions representing that sequence, appropriate linkages to the environmental dependencies included in the benchmark shell, as in step 203. In either embodiment of the step of generating a byte code binary, 102a or 102b, the Java VM instructions representing either embodiment are then assembled into a binary byte code program (step 201).

It should be noted that the step of assembling the Java VM instructions into the binary byte code program (step 201) is not always required in some embodiments of the present invention. For example, after a byte code sequencing operation is performed to detect a frequent sequence, that sequence may be reproduced in Java directly in some situations. One such frequent sequence has the form:

dup
sipush<index>
iconst_0
bastore

Such byte code are explained in greater detail in *The Java Virtual Machine Specification* by Tim Lindholm et al., published by Addison-Wesley in 1997, which is incorporated by reference herein.

This sequence may be produced by the following Java language construct:

byte arr [ ]=[0,0,0,0, . . . 0 ];.

Given that the sequence can be produced using a Java language construct, a benchmark may be easily fabricated by inserting the aforementioned Java construct in the source code for the benchmark driver. Thus, when that benchmark is compiled and executed, the benchmark will then perform the desired sequence.

However, it should be noted that such substitutions do not always result in correctly functioning code. In such situations, byte-code assembly and subsequent injection should still be implemented.

Referring now to FIG. 1, in step 102, the binary byte code program implementing the sequence to be benchmarked is injected into the benchmark driver shell. The injection of the byte code binary into a target executable is the subject of a copending application "SYSTEM AND METHOD FOR DYNAMIC MODIFICATION OF CLASS FILES," heretofore incorporated by reference into this application. The process of byte code assembly for injection into the benchmark shell is a special case of a more general process of byte code injection assembly. Byte code injection assembly may be used for introducing new functionality into any target executable, not necessarily a Java benchmarking shell.

Refer now to FIG. 3 in which a flow chart of the process of byte code injection assembly is illustrated. The target executable is processed to update information about its environment, in step 300. This includes information such as constant pool entries for exported methods (functions), imported methods, and instance variables for classes in the executable are obtained. An embodiment of the data processing program that can provide such information is the Java class file disassembler, "javap." Javap (or its equivalent) is part of every Java VM implementation. Then, in step 301, assembly code corresponding to Java VM instructions implementing the functionality to be added is entered. These assembly code java VM instructions include instructions establishing the required linkages to the target executable environmental dependencies. The assembly code so entered is then assembled into a byte code binary in step 302. The byte code binary thus generated may then be injected into the target executable using the dynamic modification technique that is the subject of the cross-referenced copending application hereinabove incorporated by reference.

The method of byte code sequence analysis will now be described by reference to FIG. 4. FIG. 4 schematically depicts a flow chart of a byte code sequence analysis method in accordance with one embodiment to the present invention. A data processing machine initiates the process in step 400. In step 401 a byte code is entered. Although byte code analysis in accordance with an embodiment of the present invention may be implemented with byte codes being entered "by hand," byte codes from a byte code trace may also be retrieved from a data processing file. When retrieving the byte code trace from a data processing file, the following methodology may be used in one embodiment of the present invention.

In one embodiment of the present invention, the "java_g" command in the standard JavaSoft Java Development Kit (JDK) provides for method and byte code tracing. To implement byte code tracing in accordance with one embodiment of the present invention, this mechanism was modified somewhat. First, an output format was modified to be more efficient. A typical byte code trace used for profiling is several megabytes in length. The standard java_g mechanism also outputs byte code addresses, operands, and information about operand values. In the modification, the amount of data output for each byte code was limited to the byte code itself (and, in some cases, the operand value). Similarly, the output for method invocations was also modified to contain only the name of the method. Second, the byte code address for each byte code was examined. If a backward branch had been taken because a loop has been detected, a blank byte code was output prior to the byte codes at the target address of that branch. This enabled an aliasing optimization that is subsequently described in the application. Finally, the interpreter loop of the JVM was modified to poll the local file system (every several thousand byte codes) for the presence of a well-known file name (e.g., "trace_file"). As long as that file was not present, the interpreter proceeded and no tracing was enabled. When the user created the file, this engaged byte code and method tracing. This latter mechanism was employed to provide control over the start and end of method and byte code tracing, an important factor when collecting traces from very large or long-running applications.

Regardless in which manner the byte code trace is obtained, the entered byte code is then stored in step 402. It is also concatenated to all previously stored byte code sequences in step 403. In step 404, the new sequences, thus formed, are tested and any such sequence having a length exceeding a preselected maximum length is discarded. Otherwise, the sequences are stored in step 405. A counter is associated with every sequence formed by the steps of entering, storing in concatenation, steps 401–403. In step 406, the counter associated with each such sequence is incremented whenever associated sequence appears, and the sequence is stored in step 405. If the last byte code has been entered (step 407), byte code sequences and their associated counter values, which are the frequencies of occurrence of the associated sequence, are reported in step 408. The process then terminates at step 409. In an alternative embodiment of the present invention, the reporting of sequences and counter values (step 408) may be delimited by reporting only those sequences whose associated counter values exceed a preselected value. If the last byte code has not been entered, the process returns to step 401 with the entry of the next byte code in the sequence.

Figure 5B:
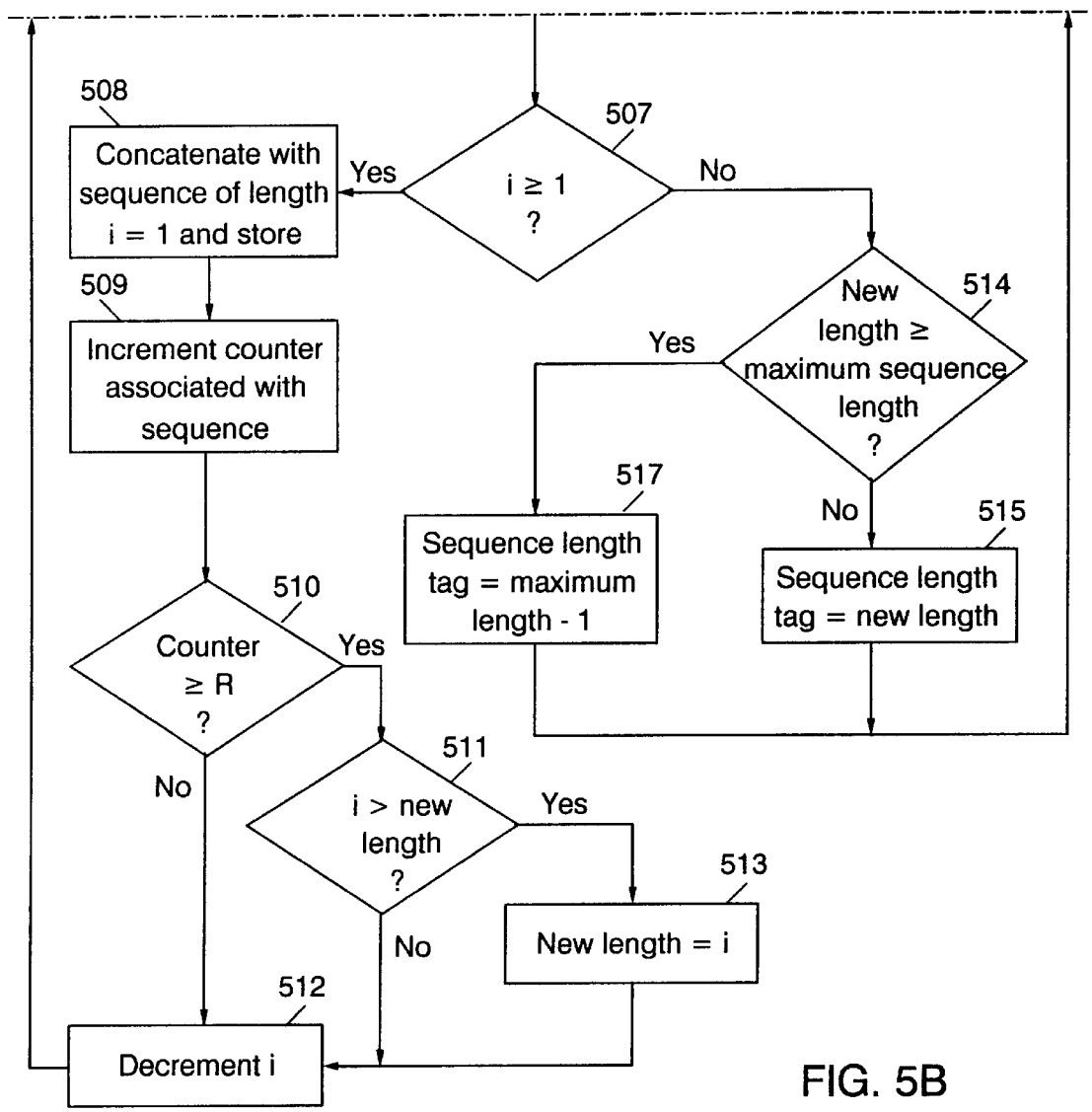
FIG. 5B depicts a second portion of a flow diagram of a byte code sequence analysis method in accordance with an embodiment of the present invention.

Refer now to FIGS. 5A and 5B in which is depicted a flow chart detailing an embodiment of byte code sequence analysis of the present invention. The process begins with a new line of a byte code input file in step 500. An entry from the file is read in step 501, and in step 502 the entry is tested to determine if it is a valid byte code. This testing operation is performed to eliminate aliases of sequences to optimize performance of the present invention. Aliases are sequences that are rotations of the same basic sequence. These aliases would be produced when sequencing code appearing in a loop, if this optimization method were not implemented. If it is not a valid byte code, the file is advanced to the next entry in step 503, and a sequence length tag value is set to zero, step 504. The process then returns to step 501 and continues. If a valid byte code has been read a new length value is set equal to zero, step 505 and a loop counter, in step 506, is set equal to the sequence length tag value plus one. The process then enters the loop at step 507 with the testing of the loop counter. If the loop counter is greater than or equal to one, the current byte code is concatenated with the sequence whose length is equal to the value of the loop counter and that sequence is stored, step 508. In step 509 a counter associated with a current sequence is incremented. In other words, in step 509 the current byte code sequence is compared with all other stored byte code sequences, and if there is a match, a counter associated with that byte code sequence is incremented by one. If the current sequence does not match any other stored sequence, then its associated counter assumes the value one. An embodiment of the present invention in which steps 508 and 509 are realized using associative arrays will be described subsequently. In step 510, the counter associated with the current sequence is tested against a preselected frequency value. If the counter is greater than or equal to the preselected frequency value, then the current byte code sequences are so-called frequently occurring sequences. Then, in step 511, the loop counter is tested against the new length value. If the loop counter value does not exceed the new length value the loop counter is decremented in step 512, and the loop is reentered at step 507. However, if the loop counter value exceeds the new length value, the new length value is set equal to the current value of the loop counter, step 513, and the loop counter is then decremented by unity, step 512 and the loop is reentered at step 507. If the current value of the loop counter is not greater than or equal to one, the new length value is tested against a preselected maximum sequence length in step 514. If the new length value does not exceed the maximum sequence length then the sequence length tag value is set equal to the new length value at step 515, and the process advances to the next entry, step 516. Thus, the sequence length tag value forms a window that moves along the byte code trace after generating the first byte code sequence have a length equal to the preselected maximum sequence length. If, however, the new length exceeds the preselected maximum sequence length and the sequence length value is set equal to the preselected maximum length minus one, in step 517, and the process advances to the next byte code entry at step 516.

Associative arrays are convenient structure for implementing steps 508 and 509 in FIGS. 5A and 5B. An associative array is a collection of pairs: an index and the corresponding array element value. In an associative array, the index does not have to be a positive integer. Any number, or even a string, can be an index. Thus, in step 508, a byte code sequence of length "i−1" is fetched from element number "i−1" of a first associative array in concatenated with the sequence so retrieved. The resulting sequence of length "i" is then stored back into element number "i" of the first associative array. Step 509 is implemented with a second associative array. The second associative array is indexed using the byte code sequence as a string value stored in the first associative array. Each element of the second associative array stores a counter. Every time an element of the second associative array is accessed, the counter value stored therein is incremented by one.

Method steps 508 and 509 using two associative arrays may be better understood by referring to FIG. 6 in which these associative arrays are schematically depicted. In FIG. 6, for simplicity, byte code values are denoted by single lower case letters. A simplified byte code trace, 600, is illustrated in this array. Byte code sequences of maximum length equal to four are considered. The state of the first associative array after the first four byte codes have been entered are shown at 601. The set of index values 601*a* are illustrated to be "1", "2", "3", and "4". The set of values stored in the respective array elements, 601*b*, are byte code sequences "b", "ab", "bab", and "abab". In reaching the displayed state of associative array 601, a set of sequences of having lengths from 1 to 4 have been generated. All unique sequences so generated form the index set 602*a* of associative array 602. In an alternate embodiment, sequences may be of length 1 to N where N is preselected. The set of array contents 602*b* contains the number of occurrences of each of the respective byte code sequences comprising the index set 602*a*. After the next byte code, "c", is entered, first associative array 603 results. The index set 603*a* of first associative array 603 is unchanged and the content set 603*b* is as illustrated. Second associative array 604 now has more elements, and its index set 604*a* includes four additional values: "c", "bc", "abc", and "abac". The contents of 604*b* of second associative array 604 is as shown with each of the four additional elements all containing the value one, each of the byte code sequences "c", "bc", "abc", and "abac" having occurred for the first time.

An implementation of associative arrays is available in the pattern matching program awk. An example of an awk script which corresponds to the method illustrated in the flow chart of FIGS. 5A and 5B is as follows:

```
1      if( (NF != 1)||(length($1) !=2) ) {
2          L = 0; # restart strings
3          next;
4      }
5
6      bc = $1;
7
8      NL = 0;
9      for (i = L + 1; i >= 1; i--) {
10         as[i] = as[i − 1] bc; # create new sequences
11         SCNT[as[i]]++;
12         if(SCNT[as[i]] >= R) {
13             if(i > NL) NL = i; # highest successful new sequence
14         }
15     }
16
17     if(NL >= LMAX) L = LMAX − 1;
18     else L = NL;
```

In the foregoing program, it should be noted that the term "as[i]" is a currently active sequence of length i. This currently active sequence is indexed by an integer number. It should be noted that in the program illustrated herein, only sequencing up to a length "LMAX" will be evaluated. Thus, there will only be as[1] through as[LMAX] entries. Each time a new byte code is examined, the values of as[i], for all i will be updated to reflect that a new byte code is part of each current sequence. Furthermore, it should be noted that the term "SCNT[x]" is a number of times that sequence x has been detected.

Furthermore, it should be noted that the first associative array, implementing the step 508 in FIGS. 5A and 5B, appears in line 11 where step 508 is performed. That associative array is denoted "as". The second associative array appears on line 12 as the associative array "SCNT". Note that the associative array SCNT is indexed by the contents of element number "i" of the associative array "as".

It should also be noted that the aforementioned program may be written in programming language other than awk script. Such other languages may include C, C++, and the like.

Figure 7:
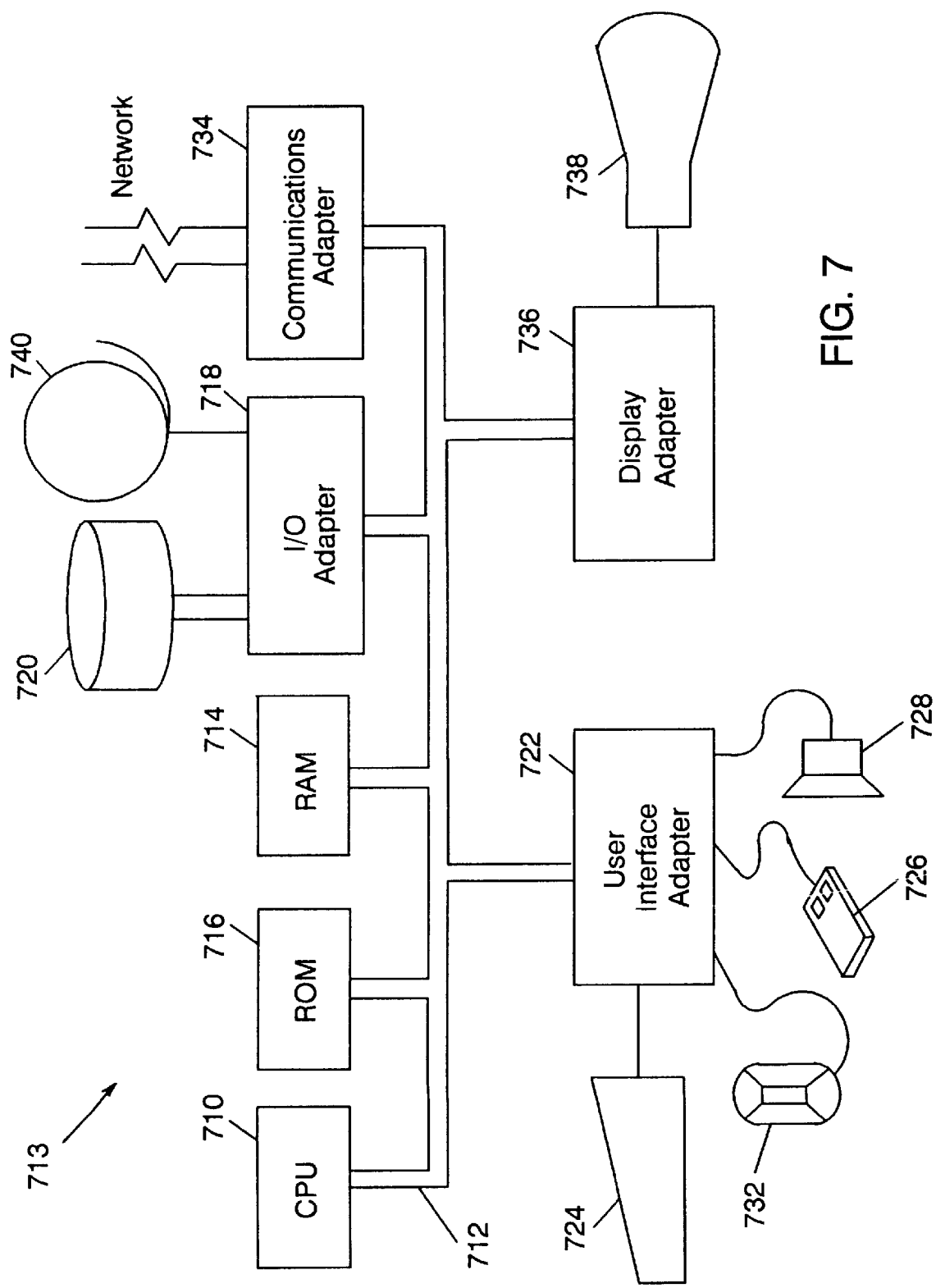
FIG. 7 depicts a data processing system configured in accordance with an embodiment of the present invention.

A representative hardware environment for practicing the present invention is depicted in FIG. 7, which illustrates a typical hardware configuration of workstation 713 in accordance with the subject invention having central processing unit (CPU) 710, such as a conventional microprocessor, and a number of other units interconnected via system bus 712. Workstation 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, speaker 728, microphone 732, and/or other user interface devices such as a touch screen device (not shown) to bus 712, communication adapter 734 for connecting workstation 713 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

The foregoing provides a description of alternate embodiments of the present invention. It should be well-known to those with skill in the relevant art that additional embodiments may also be utilized to implement a Java benchmark driver program. Furthermore, it should be noted that because the Java benchmark driver program is written in Java, the present invention is able to perform measurements in a competitive manner as Java's portability allows the Java benchmark driver program to be executed on any platform implementing a Java VM and a JIT compiler.

Although the present invention and its advantages have been described in detail, it should be understood that various changes, substitutions and alterations can be made herein without departing from the spirit and scope of the invention as defined by the appended claims.

What is claimed is:

1. In a data processing system, a method of benchmarking bytecode sequences comprising the steps of:

analyzing a bytecode trace for frequently occurring sequences;

generating a bytecode binary representation of one of said frequently occurring sequences and associated environmental dependencies; and injecting said binary bytecode program into a target executable, wherein said target executable is a benchmark driver program including coding for obtaining hardware metrics.

2. The method of claim 1 wherein said step of generating a bytecode binary representation comprises the steps of:

entering bytecode corresponding to said frequently occurring sequence; and entering bytecode corresponding to said associated environmental dependencies.

3. The method of claim 2 further comprising the step of selecting said one of said frequently occurring sequences.

4. The method of claim 1 wherein said step of generating a bytecode binary representation comprises the steps of:

entering virtual machine instructions corresponding to said frequently occurring sequence, and virtual machine instructions corresponding to said associated environmental dependencies, thereby forming a bytecode assembly program; and assembling said bytecode assembly program thereby forming a bytecode binary program.

5. The method of claim 4 further comprising the step of selecting said one of said frequently occurring sequences.

6. The method of claim 1 wherein said step of analyzing a bytecode trace for frequently occurring sequences comprises the steps of:

entering a bytecode;

storing said bytecode, thereby forming a bytecode sequence having a length of value one;

concatenating said bytecode to each stored bytecode sequence provided a stored bytecode sequence has a length not exceeding than a preselected maximum length, thereby increasing a length of each stored sequence by a unity;

incrementing a counter associated with each stored bytecode sequence; and repeating said steps of entering, storing and concatenating said bytecode, and incrementing a counter.

7. The method of claim 6 wherein said step of storing said bytecode comprises the step of storing said bytecode in a first element of a first associative array.

8. The method of claim 7 wherein said step of concatenating said bytecode to each stored bytecode sequence comprises the steps of:

accessing a second element of said first associative array;

concatenating said bytecode to a bytecode sequence contained therein, thereby creating a successor bytecode sequence; and storing said successor bytecode sequence in a third element of said first associative array.

9. The method of claim 8 wherein said step of incrementing a counter associated with said each stored bytecode sequence comprises the steps of:

indexing a second associative array by each said bytecode sequence; and incrementing a value stored in an element of said second associative array having an index value equal to said each stored bytecode sequence.

10. The method of claim 6 further comprising the step of terminating said repeating step when an event in a set of terminating events occurs.

11. The method of claim 10 wherein said step of terminating said repeating step comprises a step of testing said bytecode, and wherein said set of terminating events includes:

an invalid bytecode being encountered; and a blank character being encountered.

12. In a data processing system, a method of analyzing a bytecode trace for frequently occurring sequences comprising the steps of:

entering a bytecode;

storing said bytecode, thereby forming a bytecode sequence having a length of value one;

concatenating said bytecode to each stored bytecode sequence provided a stored bytecode sequence has a length less than a preselected maximum length, thereby increasing a length of each stored sequence by a unity;

incrementing a counter associated with each stored bytecode sequence; and repeating said steps of entering, storing and concatenating said bytecode, and incrementing a counter.

13. The method of claim 12 wherein said step of storing said bytecode comprises the step of storing said bytecode in a first element of a first associative array.

14. The method of claim 13 wherein said step of concatenating said bytecode to each stored bytecode sequence comprises the steps of:

accessing a second element of said first associative array;

concatenating said bytecode to a bytecode sequence contained therein, thereby creating a successor bytecode sequence; and storing said successor bytecode sequence in a third element of said first associative array.

15. The method of claim 14 wherein said step of incrementing a counter associated with said each stored bytecode sequence comprises the steps of:

indexing a second associative array by each said bytecode sequence; and incrementing a value stored in an element of said second associative array having an index value equal to said each stored bytecode sequence.

16. In a data processing system, a method of modifying virtual machine executables comprising the steps of:

generating a bytecode assembly program, from said executables said step of generating a bytecode assembly program including the step of entering virtual machine instructions corresponding to functionality to be incorporated, and virtual machine instructions establishing linkages to target executable; and assembling said bytecode assembly program to produce a bytecode binary program.

17. The method of claim 16 further comprising the step of injecting said binary bytecode program into a target executable.

18. A program product embodied in machine-readable program storage media, the program product operable for benchmarking bytecode sequences, said program product comprising:

programming for analyzing a bytecode trace for frequently occurring sequences;

programming for generating a bytecode binary representation of one of said frequently occurring sequences in associated environmental dependencies; and programming for injecting said binary bytecode program into a target executable, wherein said target executable is a benchmark driver program including coding for obtaining hardware metrics.

19. The program product of claim 18 wherein said programming for analyzing a bytecode trace for frequently occurring sequences comprises:

programming for entering a bytecode; programming for storing said bytecode, thereby forming a bytecode sequence having a length of value one;

programming for concatenating said bytecode to each stored bytecode sequence provided a stored bytecode sequence has a length not exceeding a preselected maximum length, thereby increasing a length of each stored sequence by unity;

programming for incrementing a counter associated with each stored bytecode sequence; and programming for repeating said steps of entering, storing and concatenating said bytecode, and incrementing a counter.

20. The program product of claim 19 wherein said programming for storing said bytecode comprises programming for storing said bytecode in a first element of a first associative array.

21. The program product of claim 20 wherein said programming for concatenating said bytecode to each stored bytecode sequence comprises:

programming for accessing a second element of said first associative array;

programming for concatenating said bytecode to a bytecode sequence contained therein, thereby creating a successor bytecode sequence.

22. The program product of claim 21 wherein said programming for incrementing a counter associated with said each stored bytecode sequence comprises:

programming or indexing a second associative array by each said bytecode sequence; and programming for incrementing a value stored in an element of said second associative array having an index value equal to said each stored bytecode sequence.

23. The program product of claim 18 wherein said programming for generating a bytecode binary representation comprises:

programming for entering bytecode corresponding to said frequently occurring sequence; and programming for entering bytecode corresponding to said associated environmental dependencies.

24. The program product of claim 18 wherein said programming for generating a bytecode binary representation comprises:

programming for entering virtual machine instructions corresponding to said frequently occurring sequence, and virtual machine instructions corresponding to said associated environmental dependencies, thereby forming a bytecode assembly program; and programming for assembling said bytecode assembly program thereby forming a bytecode binary program.

25. A program product embodied in machine readable program storage media, the program product operable for modifying virtual machine executables, said program product comprising:

programming for generating a bytecode assembly program from said executables, said programming for generating a bytecode assembly program including programming for entering virtual machine instructions corresponding to functionality to be incorporated, and virtual machine instructions establishing linkages to target executable; and programming for assembling said bytecode assembly program to produce a bytecode binary program.

26. The program product of claim 25 further comprising programming for injecting said binary bytecode program into a target executable.

27. A program product embodied in machine readable program storage media, the program product operable for analyzing a bytecode trace for frequently occurring sequences, said program product comprising:

programming for entering a bytecode;

programming for storing said bytecode, thereby forming a bytecode sequence having a length of value one;

programming for concatenating said bytecode to each stored bytecode sequence provided a stored bytecode sequence has a length less than a preselected maximum length, thereby increasing a length of each stored sequence by a unity;

programming for incrementing a counter associated with each stored bytecode sequence; and programming for repeating said steps of entering, storing and concatenating said bytecode, and incrementing a counter.

28. The program product of claim 27 wherein said programming for storing said bytecode comprises programming for storing said bytecode in a first element of a first associative array.

29. The program product of claim 28 wherein said programming for concatenating said bytecode to each stored bytecode sequence comprises:

programming for accessing a second element of said first associative array;

programming for concatenating said bytecode to a bytecode sequence contained therein, thereby creating a successor bytecode sequence; and programming for storing said successor bytecode sequence in a third element of said first associative array.

30. The program product of claim 29 wherein said programming for incrementing a counter associated with said each stored bytecode sequence comprises:

programming for indexing a second associative array by each said bytecode sequence; and programming for incrementing a value stored in an element of said second associative array having an index value equal to said each stored bytecode sequence.

31. A data processing system comprising:

circuitry for analyzing a bytecode trace for frequently occurring sequences;

circuitry for generating a bytecode binary representation of one of said frequently occurring sequences and associated environmental dependencies; and circuitry for injecting said binary bytecode program into a target executable, wherein said target executable is a benchmark driver program including coding for obtaining hardware metric.

32. The data processing system of claim 31 wherein said circuitry for analyzing a bytecode trace for frequently occurring sequences further comprises:

circuitry for storing said bytecode, thereby forming a bytecode sequence having a length of value one;

circuitry for concatenating said bytecode to each stored bytecode sequence provided a stored bytecode sequence has a length not exceeding than a preselected maximum length, thereby increasing a length of each stored sequence by a unity;

circuitry for incrementing a counter associated with each stored bytecode sequence; and circuitry for repeating said steps of entering, storing and concatenating said bytecode, and incrementing a counter.

33. The data processing system of claim 32 wherein said circuitry for storing said bytecode further comprises circuitry for storing said bytecode in a first element of a first associative array.

34. The data processing system of claim 33 wherein said circuitry for concatenating said bytecode to each stored bytecode sequence comprises:

circuitry for accessing a second element of said first associative array;

circuitry for concatenating said bytecode to a bytecode sequence contained therein, thereby creating a successor bytecode sequence; and circuitry for storing said successor bytecode sequence in a third element of said first associative array.

35. The data processing system of claim 34 wherein said circuitry for incrementing a counter associated with each stored bytecode sequence comprises:

circuitry for indexing a second associative array by each said bytecode sequence; and circuitry for incrementing a value stored in an element of said second associative array having an index value equal to said each stored bytecode sequence.

36. The data processing system of claim 31 wherein said circuitry for generating a bytecode binary representation further comprises:

circuitry for entering bytecode corresponding to said frequently occurring sequence; and circuitry for entering bytecode corresponding to said associated environmental dependencies.

37. The data processing system of claim 18 wherein said circuitry for generating a bytecode binary representation further comprises:

circuitry for entering virtual machine instructions corresponding to said frequently occurring sequence, and virtual machine instructions corresponding to said associated environmental dependencies, thereby forming a bytecode assembly program; and circuitry for assembling said bytecode assembly program thereby forming a bytecode binary program.

38. A data processing system for modifying virtual machine executables comprising:

circuitry for generating a bytecode assembly program, from said executables said circuitry for generating a bytecode assembly program including circuitry for entering virtual machine instructions corresponding to functionality to be incorporated, virtual machine instructions establishing linkages to target executable; and circuitry for assembling said bytecode assembly program to produce a bytecode binary program.

39. The data processing system of claim 38 further comprising circuitry for injecting said binary bytecode program into a target executable.

40. A data processing system for analyzing a bytecode trace for frequently occurring sequences comprising:

circuitry for entering a bytecode;

circuitry for storing said bytecode, thereby forming a bytecode sequence having a length of value one;

circuitry for concatenating said bytecode to each stored bytecode sequence provided a stored bytecode sequence has a length less than a preselected maximum length, thereby increasing a length of each stored sequence by a unity;

circuitry for incrementing a counter associated with each stored bytecode sequence; and circuitry for repeating said steps of entering, storing and concatenating said bytecode, and incrementing a counter.

41. The data processing system of claim 40 wherein said circuitry for storing said bytecode comprises circuitry for storing said bytecode in a first element of a first associative array.

42. The data processing system of claim 41 wherein said circuitry for concatenating said bytecode to each stored bytecode sequence comprises:

circuitry for accessing a second element of said first associative array;

circuitry for concatenating said bytecode to a bytecode sequence contained therein, thereby creating a successor bytecode sequence; and circuitry for storing said successor bytecode sequence in a third element of said first associative array.

43. The data processing system of claim 42 wherein said circuitry for incrementing a counter associated with said each stored bytecode sequence comprises:

circuitry for indexing a second associative array by each said bytecode sequence; and circuitry for incrementing a value stored in an element of said second associative array having an index value equal to said each stored bytecode sequence.

* * * * *